United States Patent [19]

Salant

[11] Patent Number: 5,499,824
[45] Date of Patent: Mar. 19, 1996

[54] MECHANICAL SEAL WITH COMPLIANT FACE

[75] Inventor: Richard F. Salant, Dunwoody, Ga.

[73] Assignee: Georgia Tech Research Corporation, Atlanta, Ga.

[21] Appl. No.: 221,087

[22] Filed: Mar. 29, 1994

[51] Int. Cl.$^6$ ..................................................... F16J 15/34
[52] U.S. Cl. .......................... 277/95; 277/96.1; 277/96.2
[58] Field of Search ................................... 277/92, 95, 96, 277/96.1, 96.2, 235 A

[56] References Cited

U.S. PATENT DOCUMENTS

| 3,389,921 | 6/1968 | Lojkutz | 277/96.2 X |
|---|---|---|---|
| 3,391,964 | 7/1968 | Miyake | 277/92 X |
| 3,601,182 | 8/1971 | Rao et al. | 277/96 X |
| 3,738,667 | 6/1973 | Symons | 277/96.1 |
| 3,893,505 | 7/1975 | Fujikake et al. | 277/96.1 X |
| 3,921,986 | 11/1975 | Geary et al. | 277/83 |
| 4,099,728 | 7/1978 | Weise | 277/96 |
| 4,212,475 | 7/1980 | Sedy | 277/96 |
| 4,290,613 | 9/1981 | Scott | 277/96.2 X |
| 4,295,654 | 10/1981 | Kawamura et al. | 277/92 |
| 4,552,368 | 11/1985 | Wallace | 277/27 |
| 4,575,100 | 3/1986 | Hay, II et al. | 277/96.1 X |
| 4,792,146 | 12/1988 | Lebeck et al. | 277/26 |
| 4,969,652 | 11/1990 | Munson | 277/22 |
| 4,991,450 | 2/1991 | Schaarschmidt | 73/863.6 |
| 5,053,093 | 10/1991 | Ciccarelli et al. | 277/96.1 |
| 5,316,072 | 5/1994 | Seike et al. | 277/96.2 |
| 5,385,409 | 1/1995 | Ide | 277/96.1 |
| 5,399,024 | 3/1995 | Shapiro | 277/96.1 X |

FOREIGN PATENT DOCUMENTS

| 1200052 | 12/1985 | U.S.S.R. | 277/92 |
|---|---|---|---|
| 1283867 | 8/1970 | United Kingdom . | |

Primary Examiner—Scott W. Cummings
Attorney, Agent, or Firm—Hopkins & Thomas

[57] ABSTRACT

A hydrostatic type of fluid seal for use with a rotating shaft within a housing has a compliant face in non-contacting relationship to a hard planar face. The compliant face includes a compliant foundation member having a foil member on one surface thereof. In one embodiment of the invention, the compliance of the foundation member is made to vary with the seal radius, with the stiffest portion of the compliant foundation member being in the region of the inside radius or diameter, and the most yieldable portion being in the region of the outside radius or diameter.

22 Claims, 5 Drawing Sheets

MECHANICAL SEAL WITH COMPLIANT FACE

FIELD OF INVENTION

This invention relates to mechanical face seals, and, more particularly, to a hydrostatic mechanical seal having a compliant face.

BACKGROUND OF THE INVENTION

In general, mechanical face seals are used in a rotating shaft/stationary housing milieu to control fluid leakage between two different pressure regions through which the shaft passes. Such seal arrangements are particularly useful with gas compressors in processing industries or pipe lines, and with centrifugal type pumps which find use in any number of areas such as, for example, petroleum and petrochemical applications, pipeline pumps, and feedwater pumps for boilers.

In U.S. Pat. No. 3,921,986 of Geary et al. there is shown one type of mechanical face seal in which a floating carbon ring is situated between an annular collar on the rotating shaft and a non-rotating sleeve mounted in the housing. The carbon ring is biased into contact with a contact ring carried by an annular collar, and the face-to-face contact provides the desired sealing. In U.S. Pat. No. 4,099,728 of Wiese there is shown a mechanical face seal in which face-to-face contact is between a relatively hard rotating sealing ring and a relatively soft stationary sealing ring having a back-up ring of hard material which minimizes distortion of the soft ring under operating conditions. The seal is biased to maintain constant face-to-face contact as the soft material wears down. In U.S. Pat. No. 4,552,368 of Wallace there is shown a mechanical face seal wherein the sealing faces of the stationary member and the rotary member are urged into contact with each other by the pressure of leaking gas. Thus, where there is no leak, the faces are not in contact and there is little wear. A feature of the Wallace seal is a mechanism for moving the faces into contact before any leak between them can occur. In each of the foregoing arrangements, the problems of pressure and thermal distortions prevent the seals from maintaining full parallelism of the contacting seal faces, and hence, from maintaining sealing integrity. In addition, such face-to-face seals have a high rate of wear and require, in most cases, disassembly of the seal and replacement of the face rings after wear has destroyed the integrity of the seal. In U.S. Pat. No. 4,792,146 of Lebeck et al. there is shown a radially compliant seal having a zero net thermal taper which insures full face-to-face contact between the sealing elements and hence uniform wear without loss of sealing integrity. However, wear does occur as a result of the sliding contact of the sealing surfaces.

An answer to the wear problem is found in the use of non-contacting seal faces, primarily for either hydrodynamic (dependent on rotation) or hydrostatic (non-dependent on rotation) seals. In U.S. Pat. No. 4,212,475 of Sedy there is shown such a non-contacting hydrodynamic face seal wherein one of the seal faces has spiral grooves cut therein to assure hydrodynamic generation of elevated pressures between the radially extending faces. The flat-faced hydrostatic mechanical seal, which, by definition, is not dependent on the shaft rotating, with controlled leakage wherein the faces are separated with a film of fluid (gas or liquid), is strongly dependent on the coning of the seal faces due to fluid pressure and thermal effects. Thus, the film stiffness is positive only if the coning is positive, where the seal gap is convergent in the direction of leakage flow, and decreases very steeply if the coning is reduced. If there is zero coning, the stiffness is zero, and if there is negative coning, it is negative, and the seal is unstable. Thus, a hydrostatic seal must be designed to operate with positive coning. The coning, which may be defined as the difference between the film thickness at the outside diameter (OD) of the seal and at the inside diameter (ID) thereof must be small to obtain a thin enough film for acceptable controlled leakage. This desired difference in thickness is generally on the order of one to two microns (1–2 μ). Inasmuch as mechanical and thermal deformations are of the same order, it has heretofore been difficult to engineer a seal having just the right amount of positive coning to yield a desired stiffness. Furthermore, if operating conditions change, the coning can change by a significant amount, as will the stiffness. Thus, conventional hydrostatic fluid seals in operation are at risk of operating with low or negative stiffness which can result in instability and fluid film collapse with consequent failure of the seal. The problem of coning is addressed to some extent in the aforementioned prior art patents, but primarily in the context of undesirable and irregular wear of the seal faces.

SUMMARY OF THE INVENTION

The present invention is directed to the improvement of the stiffness characteristics of hydrostatic seals, and hence, an increased efficiency and reliability of the seal by a seal structure in which one of the seal faces is compliant. In a preferred embodiment of the invention, a shaft, rotatable in a housing, has slidably, but not rotatably, mounted thereon a first sealing ring having a flat seal face. The ring, which may be a suitable hard material such as, for example, tungsten carbide in effect floats on the shaft, and is biased as by a suitable spring toward a second sealing ring. The second sealing ring, which is fixedly mounted in the housing, has a rigid foundation base of, for example, stainless steel. The second ring has a flat face situated opposite the floating face of the first ring. Affixed to the flat face is an elastic foundation member, which may be made, for example, of elastomeric foam, on the surface of which is affixed a foil skin of a material such as boron nitride, which forms the second flat face of the seal. As will be seen hereinafter, other materials, or springs, may be used to constitute the elastic foundation.

In operation, the seal of the invention experiences a pressure distribution in the film, and hence, on the foil skin compliant face, that is highest at the OD and decreases toward the ID. As a consequence, the compliant face undergoes positive coning, which as noted hereinbefore, results in the desired positive stiffness. Even in the case where the foundation base experiences negative coning, the consequence of which would normally be negative stiffness and seal instability, the elastic foundation can be chosen such that the deformation of the foil produces enough positive coning to compensate for the negative coning of the base, thereby insuring seal stability.

In accordance with other aspects of the invention, the performance characteristics of the compliant seal of the illustrative embodiment are further improved by constructing the elastic foundation to impart an elastic stiffness thereto that varies with radius, with the stiffness being highest near the ID, and decreasing toward the OD. This graduated stiffness characteristic can be imparted by a radially varying density in the elastomeric foam, or by a series of small springs of varying stiffness.

The compliant seal of the present invention insures positive coning and positive stiffness over a wide operating range, hence, any possible instabilities are eliminated.

DETAILED DESCRIPTION

Figure 1:
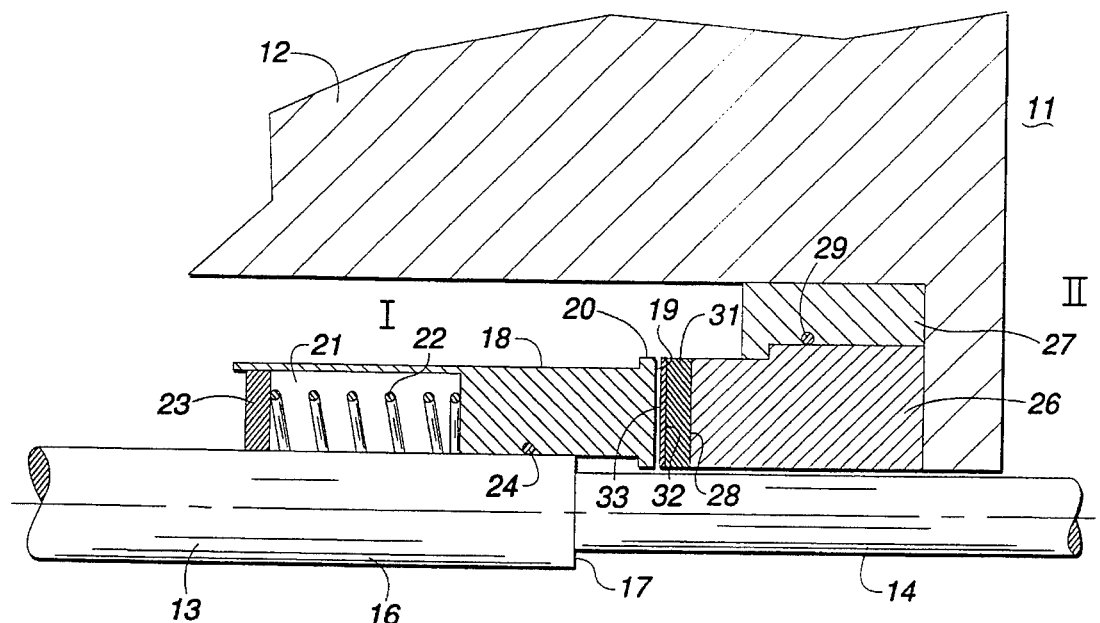
FIG. 1 is a partial elevation view, is cross section of the seal of the present invention.

In FIG. 1 there is shown a hydrostatic mechanical seal 11 in accordance with the principles and features of the present invention, for providing a gas seal. It is to be understood that the seal of FIG. 1 functions for other fluids also, but will be illustrated here as a hydrostatic gas seal. The function of seal 11 is to provide sealing between a relatively high pressure region I within a housing 12 and a relatively low pressure, e.g., atmospheric pressure, region II externally of the housing 12 for a shaft 13 rotatable within housing 12. Shaft 13 is depicted as having a first diameter portion 14 and a second, larger diameter portion 16 forming a shoulder 17, however it is not necessary that shaft 13 be so stepped, that shown in FIG. 1 being by way of example only. Both housing 12 and shaft 13 are of suitable metal, such as steel.

Seal 11 comprises a floating ring member 18 of a hard metallic material such as tungsten carbide, for example, which has a flat face 19. The rear portion of member 18 has a bore 21 therein which houses a coil spring 22. The front portion of ring member 18 has a shoulder 20 thereon for limiting rearward movement of member 18 by butting against shoulder 17. A ring member 23 is mounted to shaft 13 and provides a bearing surface for one end of spring 22, as shown, and floating ring member 18 is free to move relative thereto in a direction parallel to the axis of shaft 13. Ring member 18 may be keyed or otherwise mounted to shaft 13 so as to be free to move longitudinally, but rotate with the shaft.

Because the ring member 18 moves relative to shaft 13, an O-ring 24 of suitable material is used to provide a seal between shaft 13 and floating ring member 18.

The stationary portion of seal 11, i.e., that portion affixed to housing 12, comprises a rigid foundation base member 26 which surrounds shaft 14 and is held in place within housing 12 by means of a holding member 27. Base member 26, which may be of suitably rigid material such as, for example, carbon-graphite, stainless steel, or a suitable rigid ceramic material, has a hard flat front face 28. An O-ring 29 of suitable material forms a seal between base member 26 and holding member 27. Affixed to front face 28 is an elastic foundation member 31 having a face 32 upon which is fixed a seal face member 33 comprising, for example, a foil skin 33. The material of foundation member 31 is, in the embodiment of FIG. 1, preferably an elastomeric foam, and the material of the foil skin is, for example, boron-nitride. In operation, the seal 11 experiences a pressure distribution in the film, i.e., the gas between the faces 19 and 33, that is highest at the outside diameter (OD) and which decreases toward the inside diameter (ID). Because the foil 33 and foundation member 31 are compliant, they will, as a consequence of this pressure, exhibit positive coning and positive film stiffness. In the case where the pressure and temperature are such as to tend to produce negative coning, which would result in negative film stiffness and seal instability, the compliance of foundation member 31 may be so chosen as to overcome this tendency and produce positive coning.

Figure 2:
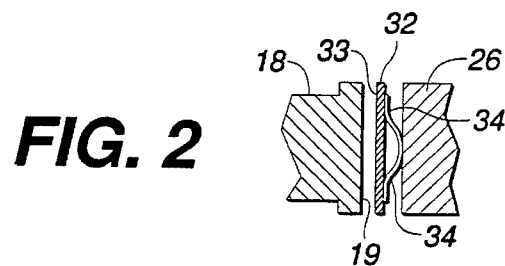
FIG. 2 is a partial view of a modification of the seal of FIG. 1.

In accordance with an aspect of the invention, the compliance of foundation member 31 may be made variable with radius so that it exhibits greatest stiffness, or least compliance, at the ID, which stiffness decreases toward the OD, where it is least. The variation in stiffness may be imparted by foundation member 31 of elastomeric foam, the density of which decreases from ID to OD, or, as shown in FIG. 2, by spring members 34 which constitute at least a portion of foundation member 21, with the spring or springs 34 decreasing in restoring force or compression resistance from ID to OD. It is to be understood that the arrangement of FIG. 2 is depicted schematically, for simplicity. Other types of resilient devices might be used, such as, for example, coil springs of varying stiffness. Also, the seal face member 33 should be sufficiently stiff to resist local distortion by the springs 34 but resilient enough to meet the compliance requirements.

ANALYSIS AND RESULT

The following analysis of the seal of FIG. 1 is based upon dry gas sealing by the seal 11. The analysis is, with minor variations, also applicable to other types of fluids besides gas.

At the outset, it should be noted that a hydrostatic seal must operate with positive coning, i.e., the difference between the fluid film thickness between the faces 19 and 33 at the OD and the ID. This coning must, however, be quite small so as to insure a thin enough film for acceptable leakage, usually on the order of 1 to 2 microns.

It can be shown that, for a seal 11 with a compliant face, the film thickness h in dimensionless form is given by $$h = h_0 - (h_o - 1)\frac{(r_o - r)}{r_o - 1} + \frac{p-1}{S} \quad (1)$$

where $r_o$, is the radius at the OD, normalized by the radius at the ID, r is the radial location normalized by the radius at the ID, p is a dimensionless pressure factor, S is dimensionless foundation stiffness, and $h_o$ is the undeformed film thickness at the OD normalized by the film thickness at the ID, and is related to the coning $\Delta h^*$ $$h_o = 1 + \frac{\Delta h^*}{h_i^*} \quad (2)$$

where $h_i^*$ is the film thickness at the ID, or at $r_i$ and $\Delta h^*$ is the difference between the undeformed film thicknesses at the OD and ID. Thus, $h_o$ is a dimensionless measure of the coning of the base. Most of the parameters to be discussed hereinafter are in dimensionless form inasmuch as they are relative values and not absolute.

Figure 3:
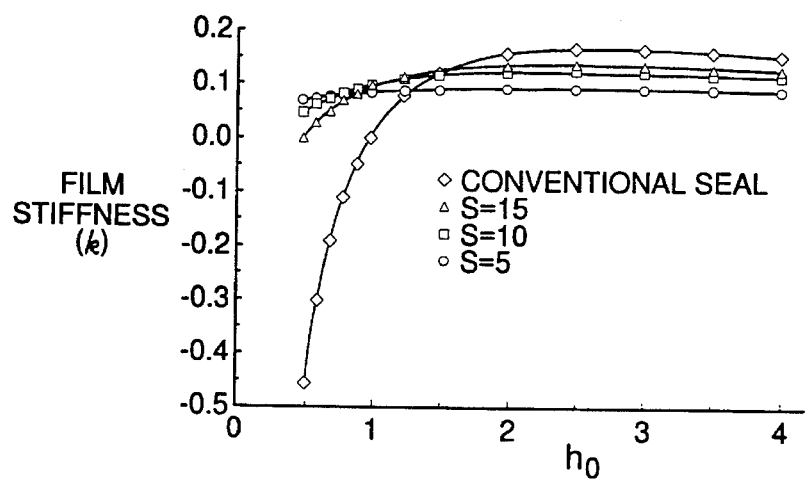
FIGS. 3 through 13 are graphs of curves demonstrating the performance of the seal of the invention as compared to that of a conventional seal in terms of a number of different parameters.

FIGS. 3 through 13 are a series of graphs resulting from a numerical solution of the governing equations. In FIG. 3 there are shown curves depicting film stiffness k versus $h_o$ for a conventional seal and for the compliant seal of the present invention, with foundation S=5, S=10, and S=15, for an outside radius $r_0$=1.2 and dimensionless pressure $p_o$=10. From the figure it can be seen that the film stiffness of the conventional seal drops very rapidly when $h_o$, is less than 2 and a value of 0.00 at $h_o$=1.0, the zero coning condition, and negative coning occurs for values of $h_o$<1.0, which is a highly undesirable result. On the other hand, for a compliant foundation stiffness of S=5, negative coning does not occur until $h_o \cong 0.5$. It can also be seen from the FIG. 3 that the maximum stiffness for a conventional seal is slightly greater than that for the compliant seal of the invention, but the latter exhibits positive coning and hence seal stability, over a much greater range of film thickness, which is a highly desirable result. For the curves of S=10 and S=15, the curves become less flat in the region $h_o<2$, but, as the foundation stiffness S is increased, the maximum stiffness increases. It can be appreciated that a continuing increase in S will produce curves that approach the curve of the conventional seal inasmuch as the seal compliance becomes less and less with increasing values of S.

Figure 4:
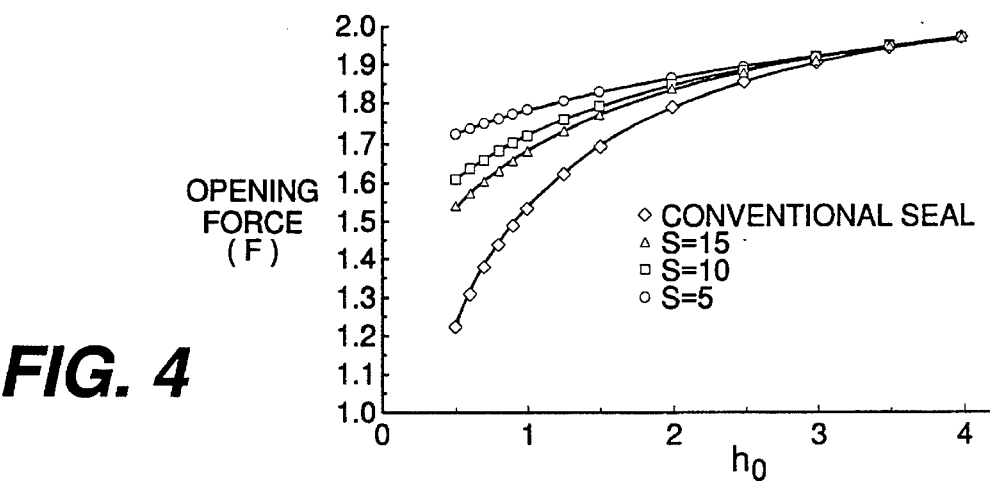

In FIG. 4 there is shown a graph of the opening force F versus the film thickness for the same values of $r_o$ and $p_o$ as used in FIG. 3. It is desirable to have the opening force as independent as possible of $h_o$. It can be seen that this desideratum is most nearly approached with the compliant seal of the present invention where the foundation stiffness S=5, and that increasing values of S approach the behavior of the conventional seal.

Figure 5:
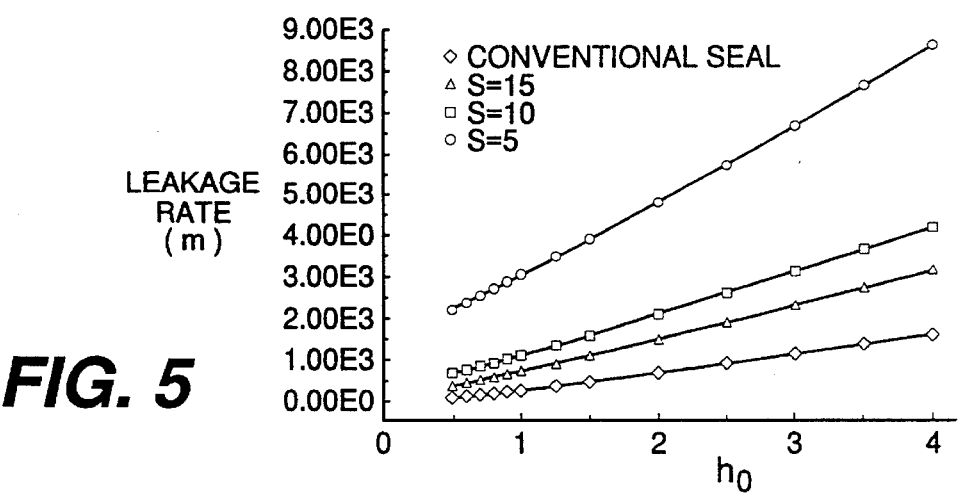

FIG. 5 is a graph of leakage rates (m) for the cases considered in FIGS. 3 and 4. It can be seen that the leakage rate (m) is less over the range of $h_o$ for a conventional seal than for the compliant seal of the invention, regardless of the value of S. This implies that some trade off between flatness of the film stiffness curve, magnitude of the film stiffness, and leakage rate is necessary. For example, where foundation stiffness S=10, the leakage rate is acceptable, and both the film stiffness and the opening force F curve are markedly superior to the corresponding curves for the conventional seal.

Figure 6:
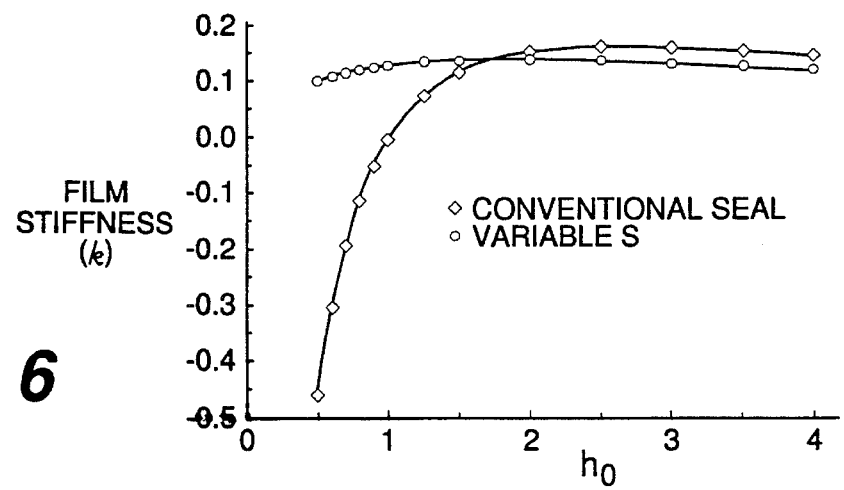
Figure 7:
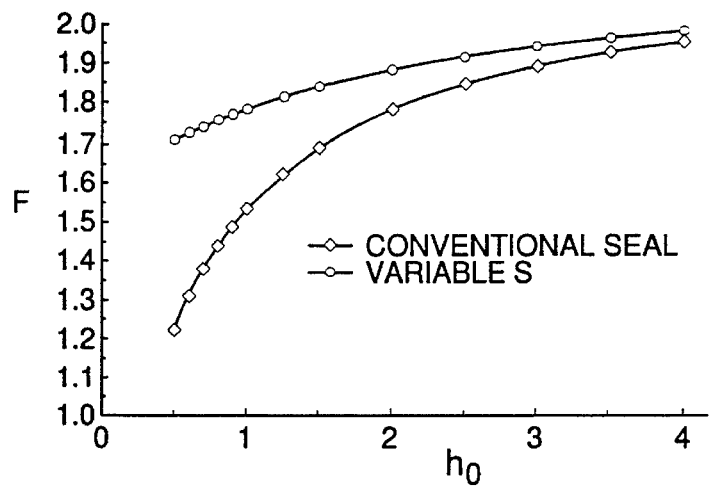
Figure 8:
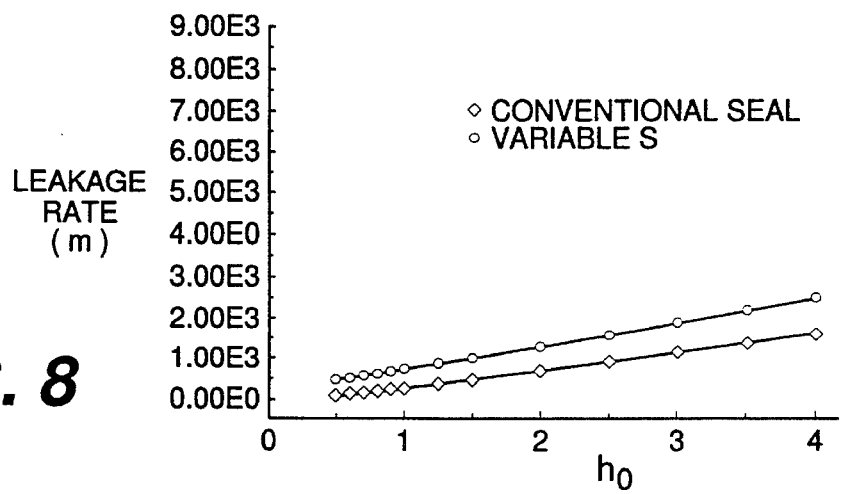
Figure 9:
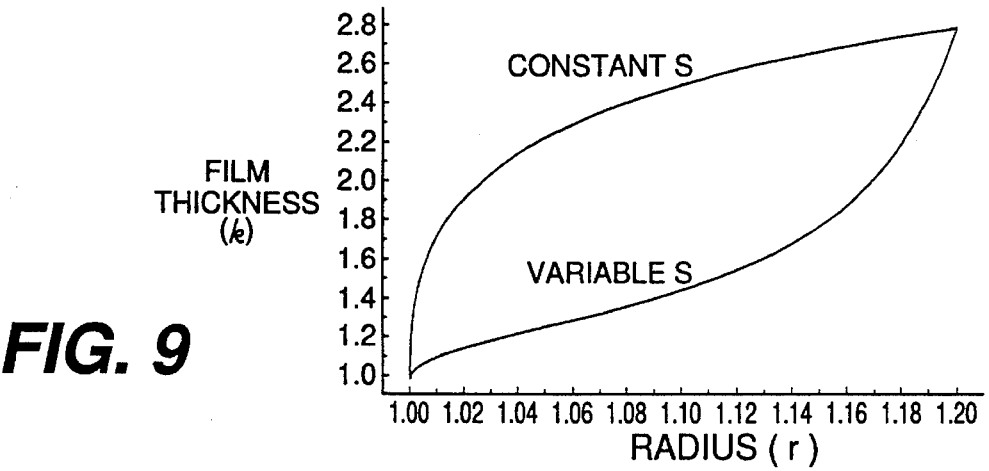
Figure 10:
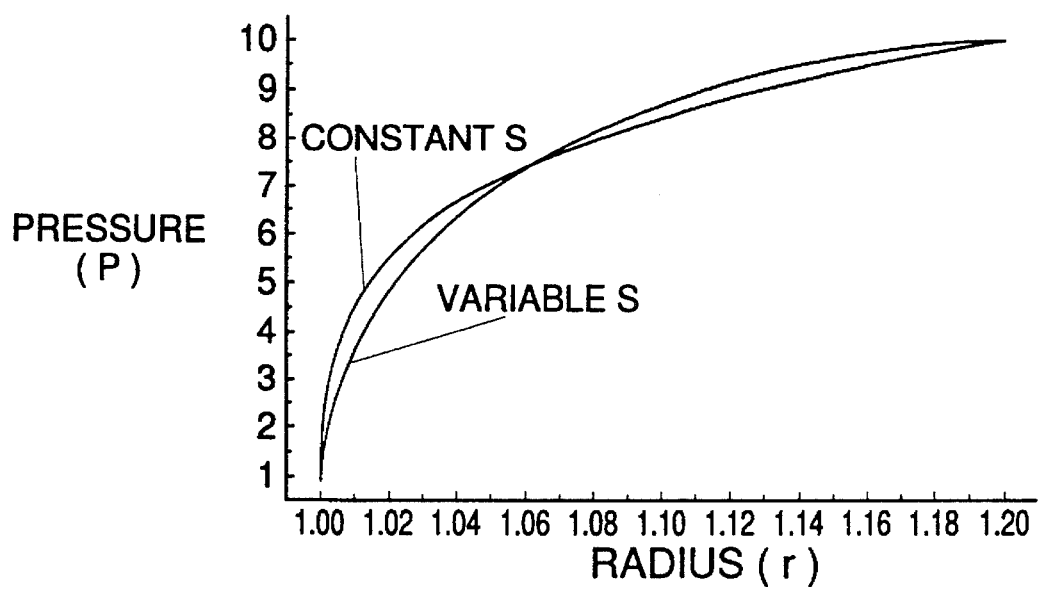

It has been found that the performance of the compliant seal of the invention can be materially improved where the foundation stiffness is made to vary with radius. FIG. 6 is a graph similar to that of FIG. 3 for a conventional seal and a compliant seal whose foundation stiffness is given by $$S = 5 + 25 \frac{(r_o - r)}{r_o - 1} \qquad (3)$$

where r is a dimensionless radial coordinate given by the expression $r^*/r_i$ where $r^*$ is the radial coordinate and $r_i$ is the inside radius. It can be seen from FIG. 6 that the variable compliance seal is stable from values of film thickness $h_o<0.5$ and its film stiffness remains substantially flat over the range. In addition, the maximum value of film stiffness k approaches that of a conventional seal. This superiority of the variable compliance seal applies also to the opening force F curves shown in FIG. 7, where it is seen that the variable compliance seal opening force is much less dependent on $h_o$ than is the opening force of the conventional seal. The same values of $r_o$ and $p_o$ were used for the curves of FIGS. 6 and 7 as were used for FIGS. 3, 4 and 5. The leakage rate for the variable seal, as shown in FIG. 8, is only slightly greater than that for a conventional seal, and is well within acceptable limits. This represents a marked improvement over the performance of the compliant seal of constant S, the leakage performance of which is shown in FIG. 5 and can be more readily understood with reference to FIGS. 9 and 10. FIG. 9 is a graph depicting the film thickness h distribution versus radius for the compliant seal of constant S and the variable compliance seal, i.e., variable S. For the constant S case, going from the OD ($r \cong 1.2$) to the ID ($r \cong 1.0$), the film remains quite thick until just before the ID is reached, where it necks down drastically. This is because the pressure distribution is non-linear, as shown in FIG. 10. As seen in FIG. 10, relatively high pressure exist throughout most of the radial extent and deformation occurs in that region, resulting in a thick film and relatively high leakage rate in the region. For the variable S case, however, the foundation stiffness is greatest at the ID, and it can be seen from FIG. 9 that the film thickness is markedly less than the constant S case over substantially the entire radial extent. Inasmuch as leakage rate is strongly related to film thickness, it can be appreciated from FIG. 9 that the leakage rate is markedly less for the compliant seal with variable foundation stiffness.

Figure 11:
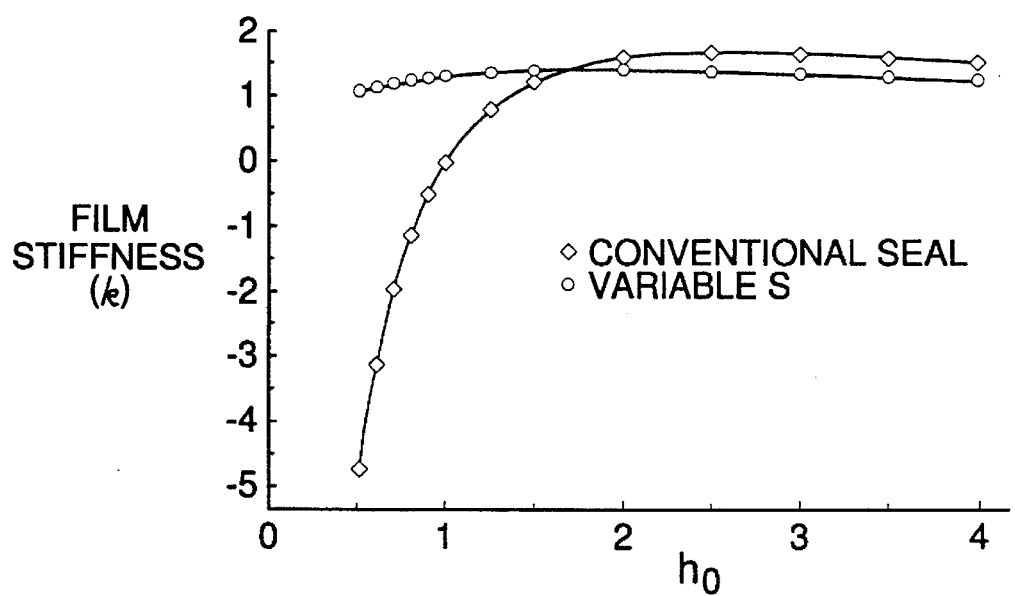
Figure 12:
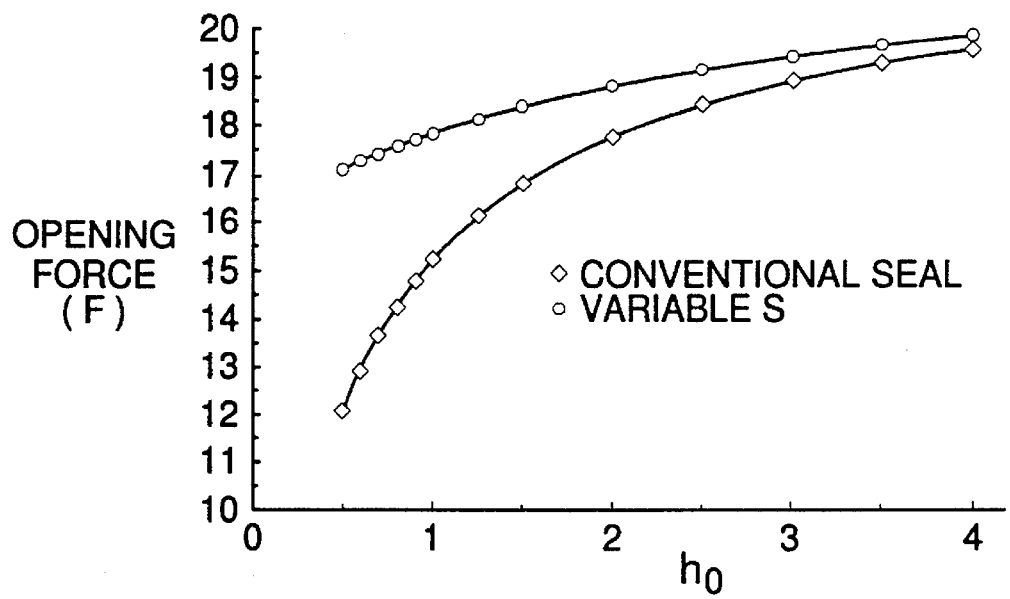
Figure 13:
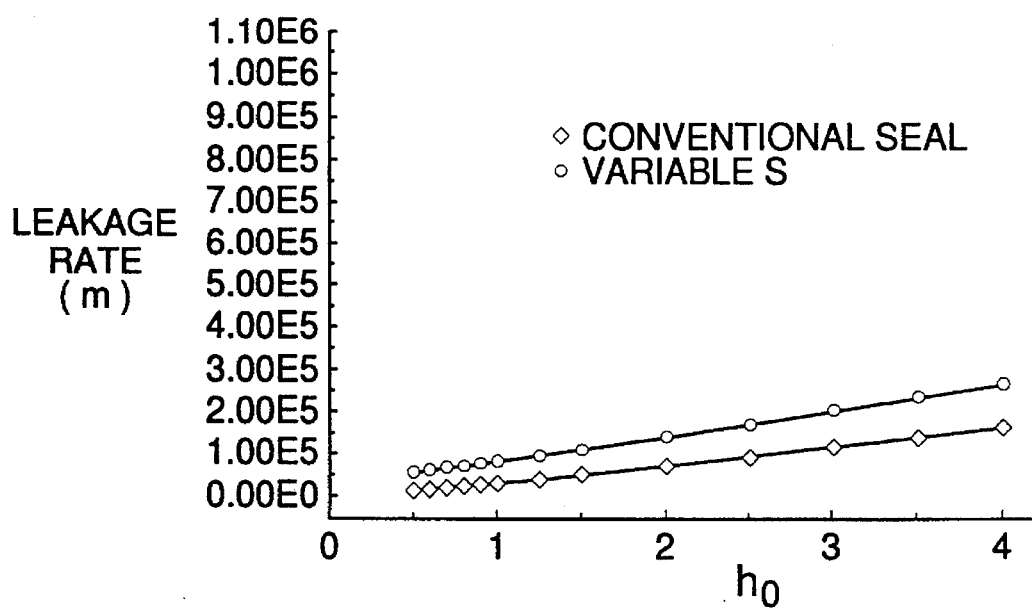

Thus far, the performance of the compliant seal of the present invention has been demonstrated, in FIGS. 3 through 10, for the conditions where $r_o=1.2$ and $p_o=10$. In FIGS. 11 through 13 the performance curves for $r_o=1.2$ and $p_o=100$ are shown for a seal with a variable stiffness ten times greater than the seal of FIGS. 6 through 8. FIG. 11 shows that the film stiffness versus film thickness behavior for the variable compliance embodiment is greatly superior to that of a conventional seal. FIG. 12 demonstrates the superior opening force performance of the variable compliance seal over that of a conventional seal, and FIG. 13 shows that the leakage rate of the variable compliance seal is only slightly greater than that of a conventional seal, and is well within acceptable limits.

The invention, as embodied in the arrangement of FIG. 1, has face 19 floating, i.e., movable in translation, and compliant face 33 mounted on a non-floating member. It is to be understood that face 19 can be made non-floating, and face 33 floating. It is also possible, and within the scope of the invention, to make face 19 compliant and face 33 stiff, or equally, to make both faces 19 and 33 compliant without departure from the spirit and scope of the invention.

From the foregoing, it can readily be seen that the compliant seal of the present invention offers generally superior performance over a conventional non-compliant seal. In particular, where the compliance of the seal is made variable with the radius, with the stiffer compliance occurring in the region of the inside diameter ID, the performance is clearly superior to that of the conventional seal without the necessity of trade-offs in the selection of the seal parameters.

The invention has been disclosed in two embodiments thereof for use as a dry gas seal. The same features and principles of the invention apply as well to seals for use with other fluids without substantial change in the basic structure of the seal. Nevertheless, some changes or modifications may occur to workers in the art without departure from the spirit and scope of the invention.

I claim:

1. A hydrostatic seal for substantially preventing fluid from passing between a rotating shaft and a housing through which the rotating shaft passes, said seal comprising:

a first sealing ring mounted on the shaft for rotation therewith, said first sealing ring having a first substantially flat face seal thereon;

a second sealing ring mounted on the housing, said second sealing ring having a second substantially flat seal face including a foil skin, and having an inside and an outside radius located opposite said first flat seal face with the foil skin of said second seal face adapted to be spaced therefrom in operation;

said second sealing ring having a compliant foundation member thereon for supporting the foil skin of said second substantially flat seal face opposite said first seal face, the compliance of said foundation member continuously varying between an inside radius and an outside radius of said foundation member to promote positive coning between the first seal face and the foil skin of the second seal face.

2. A hydrostatic seal as claimed in claim 1 wherein the compliance of said foundation member is greatest in the region of the outside radius of said foundation member, and is least in the region of the inside radius of said foundation member.

3. A hydrostatic seal as claimed in claim 1 wherein said foundation member comprises an elastomeric foam material.

4. A hydrostatic seal as claimed in claim 3 wherein said elastomeric foam is of varying density.

5. A hydrostatic seal as claimed in claim 4 wherein the density of said elastomeric foam is greatest in the region of the inside radius of said foundation member and least in the region of the outside radius of said foundation member.

6. A hydrostatic seal as claimed in claim 1 wherein said foundation member comprises one or more resilient members.

7. A hydrostatic seal as claimed in claim 6 wherein the compression resistance of said one or more resilient members decreases with increasing radius of said foundation member.

8. A hydrostatic fluid seal as claimed in claim 1 wherein the foil skin is boron nitride.

9. A hydrostatic seal having non-contacting first and second seal faces for substantially preventing fluid from passing between a rotating shaft and a housing through which the rotating shaft passes, said seal comprising:
   a first sealing ring of substantially rigid material mounted on the shaft for rotation therewith and movable in translation with respect thereto, said first ring having a first substantially flat seal face at one end thereof;
   a second sealing ring of substantially rigid material mounted on the housing and having one end thereof located opposite said first seal;
   a compliant foundation member having an inside radius and an outside radius, mounted on said one end of said second sealing ring, the compliance of the foundation member continuously varying between the inside radius and the outside radius of the foundation member to promote positive coning between the first and second seal faces;
   a substantially flat seal face member including a foil skin, mounted on said compliant foundation member;
   means for biasing said first sealing ring toward the foil skin of said substantially flat seal face member;
   the pressure of the fluid being sealed being sufficient to overcome the force of said means for biasing and the compliance of said compliant foundation member whereby said seal operates with a thin fluid film between said first seal face and the foil skin of said second seal face.

10. A hydrostatic seal as claimed in claim 9 wherein said compliant foundation member is made of an elastomeric foam material.

11. A hydrostatic seal as claimed in claim 10 wherein the density of said foam material varies with the radius of said foundation member.

12. A hydrostatic seal as claimed in claim 11 wherein the density of said foam material is greatest in the region of the inside radius.

13. A hydrostatic seal as claimed in claim 9 wherein the foil skin of said substantially flat seal member comprises a metallic foil.

14. A hydrostatic seal as claimed in claim 9 wherein said foil is made of boron-nitride.

15. A hydrostatic fluid seal for substantially preventing fluid from passing between a rotating shaft and a housing through which the rotating shaft passes, said seal comprising:
   a first seal face mounted on the rotating member;
   a second seal face including a foil skin, mounted on said housing;
   said first seal face and the foil skin of said second seal face being separated by a film of the fluid being sealed; and
   means for maintaining the stiffness of the film substantially constant over a wide range of film thicknesses, said means comprising a compliant foundation member having said one of mounted on said second seal face, the compliance of the foundation member continuously varying between an inside radius of said foundation member and an outside radius of said foundation member to promote positive coning between the first seal face and the foil skin of the second seal face.

16. A hydrostatic fluid seal as claimed in claim 15 wherein the compliance of said foundation member is least in a region of said inside radius.

17. A hydrostatic fluid seal as claimed in claim 15 wherein one of said seal faces is movable in translation relative to the other of said seal faces.

18. A hydrostatic fluid seal as claimed in claim 15 wherein the foil skin is boron nitride.

19. A hydrostatic seal for substantially preventing fluid from passing between a rotating shaft and a housing through which the rotating shaft passes, said seal comprising:
   a first sealing ring mounted on the shaft for rotation therewith, said first sealing ring having a first substantially flat face seal thereon;
   a second sealing ring mounted on the housing, said second sealing ring having a second substantially flat seal face and having an inside and an outside radius located opposite said first flat seal face with said second seal face adapted to be spaced therefrom in operation,
   said second sealing ring having a compliant foundation member thereon for supporting said second substantially flat seal face opposite said first seal face,
   said foundation member comprising an elastomeric foam material of varying density.

20. A hydrostatic seal as claimed in claim 19 wherein the density of said elastomeric foam is greatest in the region of the inside radius of said foundation member and least in the region of the outside radius of said foundation member.

21. A hydrostatic seal having non-contacting first and second seal faces for substantially preventing fluid from passing between a rotating shaft and a housing through which the rotating shaft passes, said seal comprising:
   a first sealing ring of substantially rigid material mounted on the shaft for rotation therewith and movable in translation with respect thereto, said first ring having a first substantially flat seal face at one end thereof;
   a second sealing ring of substantially rigid material mounted on the housing and having one end thereof located opposite said first seal;
   a compliant foundation member having an inside radius and an outside radius mounted on said one end of said second sealing ring;
   a substantially flat seal face member mounted on said compliant foundation member;
   means for biasing said first sealing ring toward said substantially flat seal face member;
   the pressure of the fluid being sealed being sufficient to overcome the force of said means for biasing and the compliance of said compliant foundation member whereby said seal operates with a thin fluid film between said first seal face and said second seal face,
   said compliant foundation member being made of an elastomeric foam material having a density which varies with the radius of said foundation member.

22. A hydrostatic seal as claimed in claim 21 wherein the density of said foam material is greatest in the region of the inside radius.

* * * * *